United States Patent [19]

Farmer

[11] Patent Number: 4,489,356
[45] Date of Patent: Dec. 18, 1984

[54] ENCLOSED DISK DRIVE WITH IMPROVED AIR FILTRATION SYSTEM

[75] Inventor: Paul L. Farmer, San Martin, Calif.

[73] Assignee: Atasi Corporation, San Jose, Calif.

[21] Appl. No.: 391,782

[22] Filed: Jun. 24, 1982

[51] Int. Cl.³ .............................................. G11B 5/012
[52] U.S. Cl. ...................................................... 360/97
[58] Field of Search .................................. 360/97–99, 360/86, 133, 135

[56] References Cited

U.S. PATENT DOCUMENTS 4,092,687  5/1978  Butsch .............................. 360/97 X

FOREIGN PATENT DOCUMENTS 145573  11/1981  Japan ................................. 360/133

Primary Examiner—A. J. Heinz
Attorney, Agent, or Firm—Alan H. MacPherson; Thomas S. MacDonald; Steven F. Caserza

[57] ABSTRACT

A disk drive assembly includes an internal air filter which is placed adjacent to but downstream from, the actuator assembly area thereby to pass air which has been decelerated from the rotating disk and passed through the actuator assembly area to the rotating disk while simultaneously filtering this air to remove particles. By passing through the actuator assembly area the air cools the actuator assembly and removes certain particles from this area as it is filtered.

12 Claims, 7 Drawing Figures

ENCLOSED DISK DRIVE WITH IMPROVED AIR FILTRATION SYSTEM

BACKGROUND OF THE INVENTION

1. Field of the Invention

This invention relates to memory storage devices using rotating disks (hereinafter referred to as "disk drives") for the storage of information in the form of magnetic bits and in particular to an air filtration system adapted for use with such disk drives.

2. Prior Art

Disk drives are well known in the prior art. Each disk drive generally contains a plurality of disks, each disk having two surfaces. Information is stored in concentric annular tracks on the surfaces in the form of data bits. These data bits can be stored or randomly accessed while the disk rotates at high speed. Typically to store or retrieve information on a given surface, a read/write transducer or "head" having a small coil is moved across the disk surface while the disk is spinning to the data track on which the desired information is to be stored or is located. A plurality of heads (one for each disk surface) is used in each disk drive and each head rides on a thin layer of air generated by the spinning disk in close proximity to but spaced from the disk surface.

One problem with such disks is contamination. Because the head rides or "flies" within about 10 to 18 microinches of the spinning disk, any impurity of a size greater than 10 microinches will possibly jam between the head and the spinning disk causing the head to "crash". Another problem is associated with the alignment of the disks. If the disks are not properly aligned, the disk will possibly rub on the head and thereby create debris which possibly will jam between the head and the disk again causing the head to crash. To alleviate the problems of contamination and alignment, sealed disk drives have been used. These drives include read/write heads, a carriage for the heads, a drive motor and spindle, magnetic disks mounted on the spindle, and a head drive actuating mechanism located in an area adjacent to the disks to move each head across its corresponding disk surface to the proper data track on the disk, all sealed in a housing. To reduce the possibility of impurities entered the disk environment, air from the environment is filtered before being allowed into the housing and the air which flows within the housing itself due to the spinning of the disk is also filtered.

While the motor and spindle on which the disks are mounted is sealed, air leakage can occur past the seals. This leakage increases the potential for contamination of the system, particularly if the system uses impellers on the spindle to increase the air circulation within the housing.

A standard prior art air filtration system is disclosed, for example, in U.S. Pat. No. 4,282,554, issued Aug. 4, 1981 on an application of Ho, et al. In the air filtration system of Ho et al., the air to be filtered is impelled by the disk (which rotates in a counter clockwise direction when looked at from the top) into a channel or guide mounted substantially tangentially to the disk. From this channel or guide the air is driven through the filter by the high pressure generated as a result of the rotation of the disk and then through a channel back onto the disk. The typical filter used in this prior art structure has a cross-sectional area through which air can flow of about three to four square inches. One of the limitations upon the size of the housing for a disk drive is the size of the filter required to filter the air contained within the housing.

SUMMARY OF THE INVENTION

In accordance with this invention, the filtering system used to remove particles from the air within the disk housing is advantageously located at a point downstream from the high pressure area created in the portion of the disk housing occupied by the head drive actuating mechanism rather than upstream from this mechanism as in the prior art. The location of the filter in this position, rather than directly adjacent a channel tangential to the air flow off the disk, surprisingly results in a substantial increase in the filtration efficiency of the filter unit while at the same time allowing the cross sectional flow area of the filter unit to be substantially reduced. By eliminating the channel required in the prior art systems for removing the air tangentially from the disk before it enters the filter, a further space savings is achieved. Importantly, the turbulent mixing of the air in the vicinity of the head drive actuator as it decelerates from the velocity imparted to it by the rotating disks cools the coils and other elements of the actuator and helps extend the life of the system.

DETAILED DESCRIPTION

Figure 1:
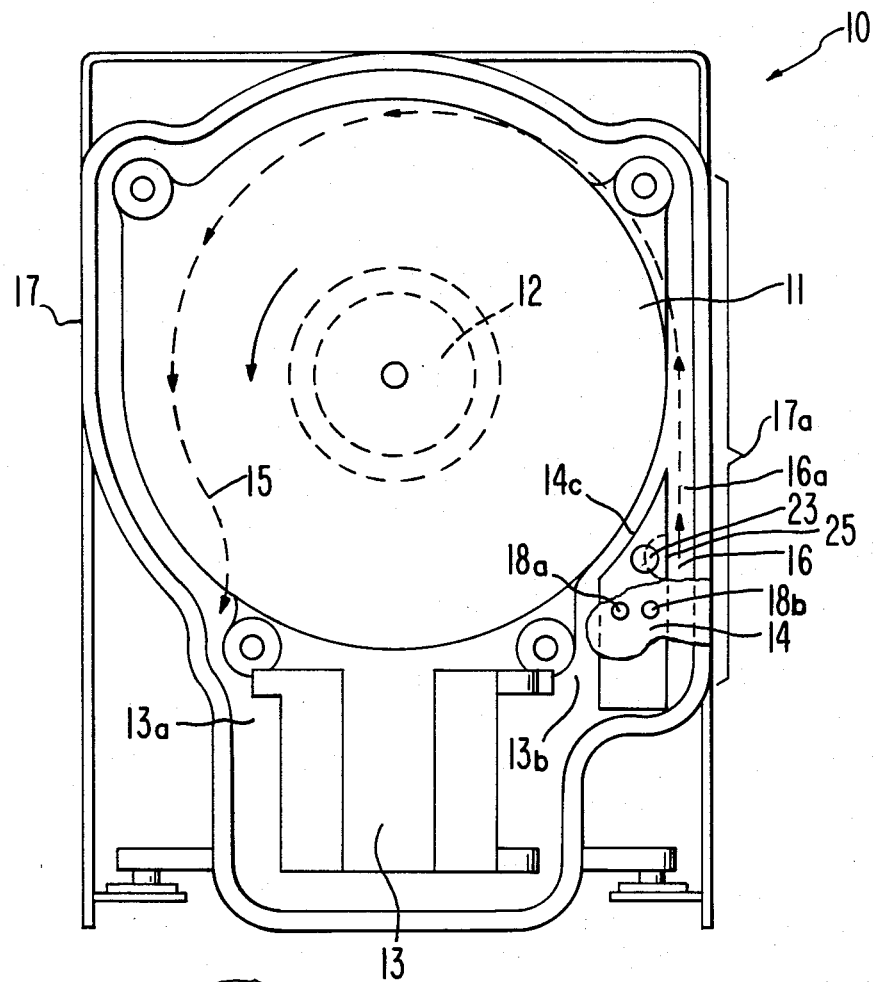
FIG. 1 illustrates a plan view of the internal arrangement of a disk housing showing the relative locations in accordance with this invention of the disk, the head positioning mechanism and the filter of this invention.
Figure 3:
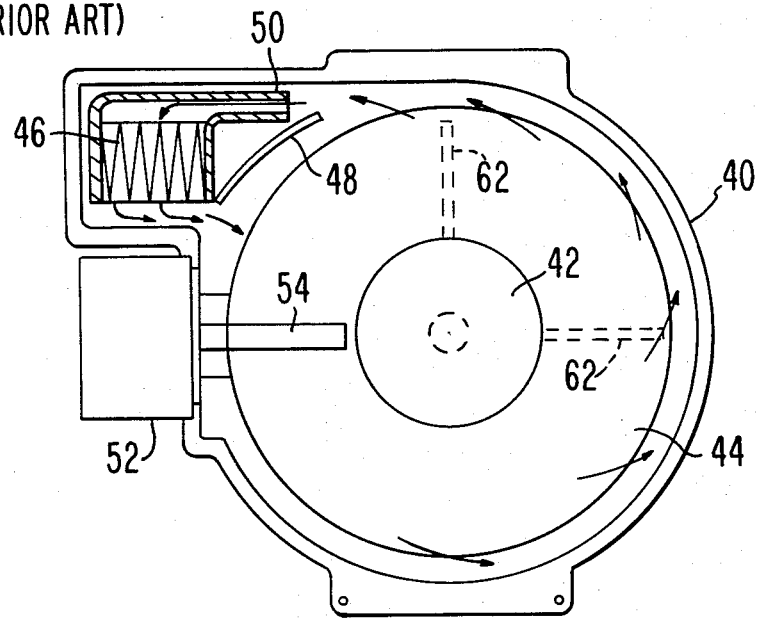
FIG. 3 illustrates the location of the filter in a prior art disk drive.

FIG. 1 illustrates in top view the mechanical structure and location of the filter of this invention in relation to the remainder of the disk assembly. As shown in FIG. 1, disk assembly 10 comprises a housing 17 within which are located a plurality of disks 11 (of which only the top disk is shown in FIG. 1) mounted on spindle 12 driven by a motor (not shown) generally beneath the spindle, a head actuator positioning mechanism (also called an "actuator assembly") 13 (shown schematically only) and the filter 14 of this invention. The actuator assembly 13 is located in an area directly adjacent disks 11 as shown. Contrary to the prior art and particularly the prior art illustrated in the U.S. Pat. No. 4,282,554 patent, the filter unit 14 of this invention is mounted on the downstream side of the head actuator assembly area 13 (i.e. to the right of area 13 in FIG. 1) rather than on the upstream side of area 13 (i.e. to the left of area 13 in FIG. 1) as illustrated in FIG. 3 of the U.S. Pat. No. 4,282,554. As shown in FIG. 3 of the U.S. Pat. No. 4,282,554 (this FIG. 3 is repeated as FIG. 3 of this specification for convenience), air (illustrated by the arrows around the circumference of disk 44) leaves disk 44 tangentially to enter channel 50 upstream of, and separate from, actuator assembly 52 (corresponding in function to actuator assembly 13 in FIG. 1). From channel 50, the air passes through filter 46 and then returns through an outflow channel to the disk area 44 where the air is again accelerated by the spinning disk 44 to flow with the disk. The rotation of the disk creates a total pressure sufficient to drive the air through filter 46. Note that the air does not flow through the actuator assembly area 52.

In accordance with this invention, the air, whose flow is indicated in FIG. 1 by the dashed line 15, leaves the disks 11 and enters the actuator assembly area 13 in region 13a. The static pressure of this air then increases due to the static pressure rise associated with the velocity drop of the air as it enters and decelerates through region 13. The pressure increase in region 13 provides the pressure to drive the air through the filter unit 14 and into channel 16 between filter unit 14 and portion 17a of sidewall 17 associated with the unit.

Figure 2A:
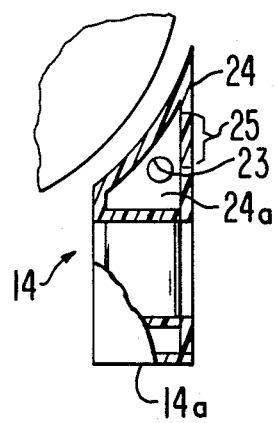
FIGS. 2a, 2b, 2c and 2d illustrate various views of the filter used in this invention.
Figure 2B:
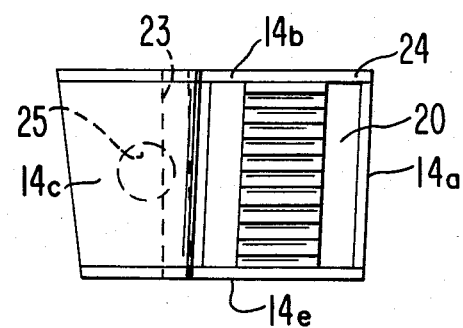
Figure 2E:
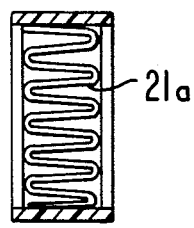
FIG. 2e illustrates in cross-section the filter used in this invention.
Figure 2C:
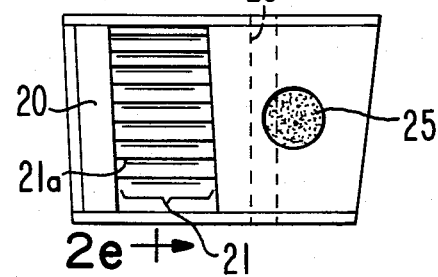
Figure 2D:
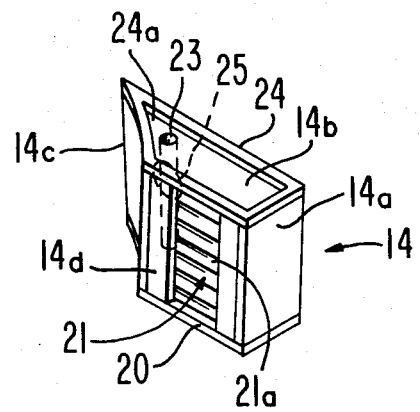

Filter unit 14 is shown in more detail in FIGS. 2a through 2d. FIGS. 2a, 2b and 2c illustrate the top, front and back views respectively of filter unit 14. FIG. 2d is an isometric view of the filter of this invention and FIG. 2e shows in cross-section a portion of filter unit 14. Referring to FIGS. 2a through 2e as appropriate, filter unit 14 comprises a housing 20, typically formed of plastic, with an opening 21 in which is located a filter element 21a. Filter element 21a typically comprises a HEPA filter (High Energy Particle Air filter) which is capable of removing any particle greater than about 0.3 microns (3,000 angstroms) in diameter although other filter elements can be used as required or appropriate. Filter unit 14 contains, in a manner well known in the art, a breather tube 23 to allow air to enter the disk drive housing 10 from the outside. Breather tube 23 extends from the top surface 14b of filter unit 14 to just above the bottom surface 14e of the filter unit. Breather tube 23 has an opening 25 from the filter unit into channel 16 (FIG. 1). A raised seal 24 is formed in a closed manner continuously around the edge of the top surface 14b of filter unit 14. Within the area surrounded by seal 24 and above top surface 14b is a space 24a in which air from outside housing 17 can enter the housing and rest before entering hole 23 to pass into the interior of disk assembly 10. Seal 24, formed of a tough, noncontaminating, closed cell gasket material of a type well known in the art, is pressed against the top of the housing 17 of assembly 10 so as to form an airtight seal between space 24a and the internal portion of housing 17. One or more small holes 18a, 18b (FIG. 1) are then formed in the top surface of the housing 17 to allow air to pass into sealed annular space 24a from the outside environment thereby to equalize the pressure between the inside and outside of housing 17. This air then passes through hole 23 and opening 25, containing a filter, into the interior of housing 17. The filter element contained within opening 25 is likewise a HEPA filter.

End 14c of filter unit 14 is curved as shown to follow the circumference of disk 11 (FIG. 1) and to block significant air flow from region 13b of the actuator assembly area 13 around the end of filter unit 14.

In operation, the air which follows trajectory 15 and enters region 13a of actuator assembly area 13 gradually decelerates and rises in pressure. This air mixes and circulates in area 13 and then passes to region 13b on the inlet side of opening 21 in filter unit 14. The pressure generated by the spinning of disk 11 is sufficient to force the air from region 13b through filter element 21a of filter unit 14 into channel 16. The air exits channel 16 at region 16a assisted by a low pressure area created by the spinning disk 11 in region 16a. The pressure drop from region 13b to region 16a is sufficient to clean the air inside housing 17 six or seven times per minute. Filter element 21a removes the particles generated within disk drive 10 as a result of the read/write heads landing on the disk and as a result of other causes.

The turbulent deceleration of the air in area 13 yields an additional advantage. The head drive actuator assembly in area 13 becomes quite warm when in use. The passage of air from disk 11 to area 13 and then back to disk 11 through filter unit 14 helps to cool the actuator assembly and also removes some particles and debris from area 13. This helps to extend the life of the actuator assembly 13.

Typically, there might be 500 particles of debris of 0.05 microns in diameter or greater per cubic foot per minute generated within the assembly. The goal is for the inside of disk housing 10 to be better than a class 100 environment which is the highest quality air standard now in use. However, aluminum oxidizes (typically housing 17 is made of aluminum) other materials generate particles and the environment itself contributes some impurities to the air. Accordingly, filter unit 14 in combination with spinning disk 11 provides a continuous air filtration system to remove all the particles within the disk assembly.

The filtration life of filter unit 14 would be typically 9 to 14 months in a normal office environment. But because the inside of disk assembly 10 is at least a class 100 environment to start with, the typical life of filter unit 14 inside housing 17 will be from 9 to 11 years.

The filter unit 14 located in accordance with this invention was tested by driving a disk 11 at normal operating speed. It was determined that by placing filter unit 14 on the downstream side of actuator assembly area 13 rather than on the upstream side of this area as in the prior art, the area of opening 21 could be made approximately $1\frac{1}{8}''$ by $\frac{5}{8}''$ or about $\frac{3}{4}$ square inches (which is about one quarter the flow area of the prior art filters) and still obtain a class 100 or better environment inside the disk drive housing 17. In tests, filter unit 14 was able to clean up the environment inside housing 17 from a class 1000 environment to better than a class 100 environment (under 25 particles per cubic foot were observed) in approximately ten seconds. The initial environment had contained approximately 250,000 particles per cubic foot. The air within housing 17 was filtered by the filter unit 14 of this system during the normal operation of disk assembly 10 from five to seven times per minute.

The above description is meant to be illustrative only and not limiting. While air is usually the gas placed within housing 17, other gases can be used, if desired. Other embodiments of this invention will be obvious in view of the above disclosure.

What is claimed is:

1. A disk drive assembly comprising:
   a housing containing a selected gas and including a housing top and housing bottom with side walls connecting the top and bottom to provide an enclosed chamber;
   at least one disk mounted so as to rotate within said housing and thereby to rotate the gas contained within said housing for removal at a disk periphery;
   at least one read/write head for reading information stored on said at least one disk;
   actuator assembly means in said housing for actuating said at least one read/write head to traverse radially across said at least one disk; said actuator assembly means being located in a housing peripheral area adjacent to an opening at a first position of said at least one disk so as to receive gas accelerated by the rotation of said disk and to turbulently mix said gas, said gas being substantially decelerated in the area of said actuator assembly so as to increase the static pressure of said gas in said area; and means for filtering the gas within said assembly, said means for filtering comprising a filter element peripherally mounted with respect to said at least one disk and placed beside said means for actuating downstream from said peripheral area such that gas pumped into said area by said at least one rotating disk flows from said area through said filter element to a channel between said filter element and a sidewall of said housing at the disk periphery and then back to said at least one disk, where said gas is reaccelerated by the rotation of disk.

2. The disk drive assembly of claim 1 wherein said filter element filters said gas to remove therefrom particles greater than a selected size.

3. Structure as in claim 2 wherein said filter removes particles greater than 0.3 microns.

4. Structure as in claim 2 wherein the cross sectional flow area of the filter element in said means for filtering comprises less than one square inch.

5. Structure as in claim 1 wherein said gas flowing from said disk to said area containing said actuator assembly means is decelerated in said area and mixes with and cools said actuator assembly means thereby to extend the life of said actuator assembly means and further to remove from said area particles and impurities.

6. Structure as in claim 1 wherein said gas comprises air and wherein said means for filtering includes aperture means in flow communication with an aperture in said housing extending exteriorly of the housing for equalizing the pressure between the air in said housing and air outside said housing.

7. Structure as in claim 6 wherein said means for filtering includes an intermediate storage cavity between the exterior of said housing and the interior of said housing for allowing air from outside the housing to come to rest before said air is further passed into the interior of said housing.

8. Structure as in claim 6 wherein said means for filtering includes a vertical filter housing mounting said filter element and said aperture means, and wherein said filter housing mounts a second filter in the air flow path between said aperture means and said channel.

9. Structure as in claim 8 in which said filter housing includes a filter seal surrounding said aperture means and sealing said filter housing to the assembly housing.

10. A disk drive assembly comprising:
an assembly housing having top and bottom portions and connecting side walls forming an interior disk area and interior actuator area laterally spaced from said disk area;
at least one disk rotatively mounted in said housing disk area which rotates to generate air flowing tangentially from a first peripheral portion of said disk toward a sidewall of said housing forming an entrance to said actuator area to direct the air flow through said actuator area;
a read/write hed for accessing information on said at least one disc;
a actuator in said housing actuator area and connected to said read/write head for actuating said read/write head to traverse said at least one disk; and
a filter unit peripherally mounted with respect to said at least one disk, said unit extending between said top and bottom portions of said housing and located on the side of said actuator area opposite said sidewall entrance which is downstream of the actuator with respect to the air flow passing through said actuator area, said filter unit including a first filter element having an entrance facing said actuator and an exit forming with a sidewall of said housing a recirculation channel to a second peripheral portion of said at least one disk.

11. The assembly set forth in claim 10 in which said filter unit further comprises a housing mounting said filter element and including a first apertured surface, said assembly housing having an second apertured surface in flow communication between ambient air exterior of said assembly housing to the first apertured surface of said vertical filter unit housing; and
a second filter element in said filter unit for filtering said ambient air and flowing ambient air into said recirculation channel.

12. The assembly set forth in claim 11 further including means for sealing said first apertured surface of said filter unit to said assembly housing so that all ambient air is filtered by said second filter element.

* * * * *